(No Model.)
M. E. HUNT.
COOKING PAN.
No. 466,416. Patented Jan. 5, 1892.
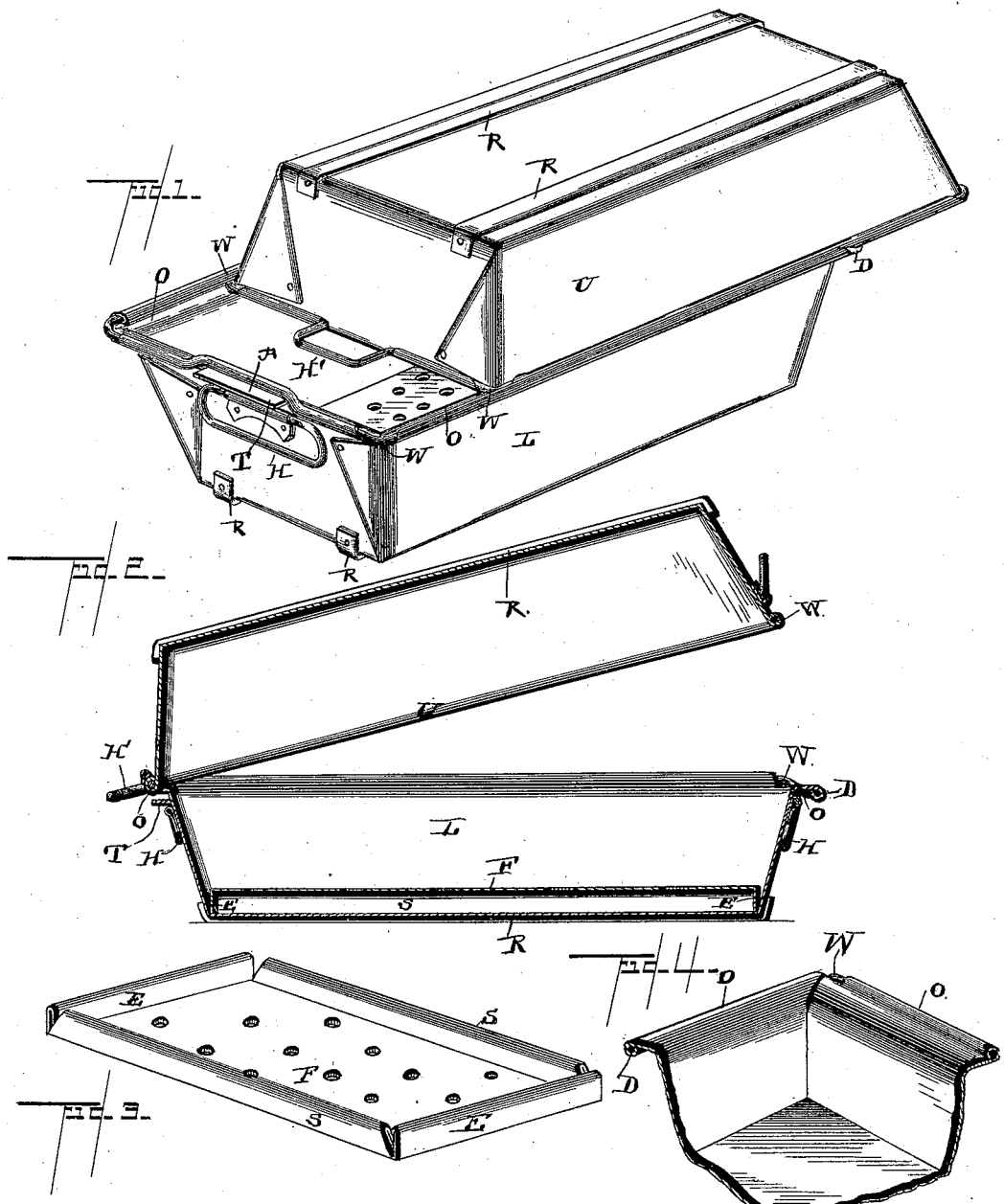
Witnesses
Inventor
Murray E. Hunt,
By his Attorneys,

UNITED STATES PATENT OFFICE.

MURRAY E. HUNT, OF PAXTON, ILLINOIS.

COOKING-PAN.

SPECIFICATION forming part of Letters Patent No. 466,416, dated January 5, 1892.

Application filed September 16, 1891. Serial No. 405,930. (No model.)

*To all whom it may concern:*

Be it known that I, MURRAY E. HUNT, a citizen of the United States, residing at Paxton, in the county of Ford and State of Illinois, have invented a new and useful Cooking-Pan, of which the following is a specification.

This invention relates to pans adapted for use for cooking purposes; and the object of the same is to effect certain improvements therein.

To this end the invention consists in the specific details of construction hereinafter more fully described and claimed, and as illustrated on the sheet of drawings, wherein—

Figure 1 is a perspective view of this improved pan with the upper member slipped partially on the lower. Fig. 2 is a central longitudinal section through the two members with the upper engaged at one end with the lower and slightly raised at its other end therefrom. Fig. 3 is a perspective detail of the false bottom inverted. Fig. 4 is a perspective detail of one corner of the lower member, showing the depressed end.

In the said drawings, the letter L designates the lower and U the upper member of this improved pan, which, it will be seen, is thus composed of two bake-pans of rectangular configuration and of the ordinary or any preferred size and construction, with the exceptions hereinafter noted—that is to say, the bottoms of these pans are rectangular and the side walls rise therefrom and flare slightly, as usual, the edges of the walls of the upper member being turned outwardly over a wire W to form a beaded edge in the usual manner. The edges of the walls of the lower member, however, are bent outwardly, as at O, in an approximately horizontal plane, and at two of the sides and one end they extend thence inwardly over a wire W to form a beaded edge, which rises above the horizontal portion O, while at the remaining end the outer edge of the horizontal portion is bent under around the wire, which latter bends downwardly, as at D, at these two corners of the member. By this means there is produced along the two sides and across one end of the lower member a horizontal track, outside of which stands the bead, and at the other end there is a similar track; but its bead is turned under. The beaded edges of the upper member (when inverted) rest on these tracks, the member being prevented from lateral displacement by the side beads and prevented from longitudinal displacement in one direction by the upwardly-projecting end bead, although it is obvious that it can be slid longitudinally, as seen in Fig. 1.

The members are provided with handles H at their ends, and these handles are preferably of the usual construction and are hinged in strap-eyes secured to the ends of the members; but one of these handles H' is formed by an extension of the bead-wire W of the upper member U and is rectangular in shape and rigidly projects from what I will call the "inner" end of this member. The corresponding end of the lower member is cut away, as at A, to form a tongue T, which is turned outwardly, and the bead-wire above this cut-away portion is bent upwardly, all as best seen in Fig. 2. Thus when the upper member stands as seen in Fig. 1 and is shoved inwardly on the tracks its rigid handle H' passes through the opening in the lower member and forms a connection between the members, which can be used as a hinge to permit the separation of the outer ends of the members, as seen in Fig. 2. When the upper member is drawn outwardly, this hinge ceases to exist by having its members drawn out of operative connection. On the outside of the bottom of each member is a pair of longitudinal runners R, on which the pan rests when placed on a stove-top, so as to hold it out of direct contact with the stove.

The false bottom F, which I preferably use in connection with this improved pan, is of sheet metal, perforated as shown, having its sides S and ends E turned downwardly, as shown, and also turned under, whereby the body will be supported above the true bottom of the lower member, and the raw edges will be also hidden, the object of the latter being obviously to prevent injury to the operator.

A bake-pan constructed in accordance with the above description will be cheap, useful, and durable, and by the employment of the tracks and of the hinge described the upper member may be adjusted longitudinally upon the lower or may be raised from the same. Such movements, together with the uses of devices of this character, are well known, and hence need not be described here.

What is claimed as new is—

1. In a bake-pan, the combination, with a lower member having a beaded upper edge with tracks inside said bead, the end wall being cut away at one point beneath the bead and bent outwardly and the bead being bent upwardly above said cut-away portion, of an upper member having a beaded lower edge, the bead-wire at one end being formed into an outwardly-projecting rigid handle of a size to pass through said cut-away portion and the edge of this member resting on said tracks, as and for the purpose set forth.

2. In a bake-pan, the combination, with a lower member of rectangular form, whose upright walls are bent outwardly near their upper edges to form tracks, and a bead-wire, the walls at the outer edges of one end and two side tracks being bent upwardly over said wire and that at the other end bending downwardly thereover, of an upper member of rectangular form having a beaded edge of the same size as said tracks, as and for the purpose set forth.

3. In a bake-pan, the combination, with a lower member of rectangular form, whose upright walls near their upper edges are bent outwardly to form horizontal tracks, and a surrounding bead-wire bent down across one end, the outer edge of the track being turned over said downwardly-bent portion at one end of the pan and being turned upwardly over the body of the wire at the sides and the other end of the pan, the latter end being provided with a cut-away portion, of an upper member of rectangular form having a beaded edge adapted to slide on said tracks, the bead-wire at one end of this member being formed into an outwardly-projecting handle of a size to pass through said cut-away portion, as and for the purpose hereinbefore set forth.

In testimony that I claim the foregoing as my own I have hereto affixed my signature in presence of two witnesses.

MURRAY E. HUNT.

Witnesses:
HILORY J. CAMPBELL,
HARRY H. KERR.